(12) United States Patent
Böcherer et al.

(10) Patent No.: US 10,951,455 B2
(45) Date of Patent: Mar. 16, 2021

(54) METHODS OF CONVERTING OR RECONVERTING A DATA SIGNAL AND METHOD AND SYSTEM FOR DATA TRANSMISSION AND/OR DATA RECEPTION

(71) Applicant: Technische Universität München, Munich (DE)

(72) Inventors: Georg Böcherer, Munich (DE); Patrick Schulte, Munich (DE); Fabian Steiner, Übersee (DE)

(73) Assignee: Technische Universität München, Munich (DE)

( * ) Notice: Subject to any disclaimer, the term of this patent is extended or adjusted under 35 U.S.C. 154(b) by 0 days.

(21) Appl. No.: 16/461,971

(22) PCT Filed: Nov. 23, 2017

(86) PCT No.: PCT/EP2017/080198
§ 371 (c)(1),
(2) Date: May 17, 2019

(87) PCT Pub. No.: WO2018/096031
PCT Pub. Date: May 31, 2018

(65) Prior Publication Data
US 2019/0342138 A1 Nov. 7, 2019

(30) Foreign Application Priority Data
Nov. 24, 2016 (EP) .................... 16200537

(51) Int. Cl.
*H04L 27/34* (2006.01)
*H04L 27/38* (2006.01)

(52) U.S. Cl.
CPC ...... *H04L 27/3433* (2013.01); *H04L 27/3411* (2013.01); *H04L 27/3845* (2013.01)

(58) Field of Classification Search
CPC ............ H04L 27/3433; H04L 27/3845; H04L 27/3411; H04L 27/3405; H04L 27/3416; H04L 27/3427; H04L 27/34; H04B 10/541
See application file for complete search history.

(56) References Cited

U.S. PATENT DOCUMENTS

| | | | |
|---|---|---|---|
| 5,388,124 A | 2/1995 | Laroia et al. | |
| 2004/0093545 A1* | 5/2004 | Khandani | ............... H04L 1/004 714/746 |
| 2010/0303171 A1* | 12/2010 | Tong | ................... H03M 13/258 375/300 |

FOREIGN PATENT DOCUMENTS

WO    WO 02/15443 A1    2/2002

OTHER PUBLICATIONS

Amjad, Rana Ali, "Algorithms for Simulation of Discrete, Memoryless Sources," a master's thesis presented to Technische Universität München Lehrstuhl für Nachrichtentechnik, Oct. 29, 2013, 75 pages.

(Continued)

*Primary Examiner* — Sam K Ahn
*Assistant Examiner* — Amneet Singh
(74) *Attorney, Agent, or Firm* — Dascenzo Gates Intellectual Property Law, P.C.

(57) ABSTRACT

Methods (C) for converting a data signal (U). The methods may comprise (i) providing an input symbol stream (IB) of input symbols (Bj), the input symbol stream (IB) being representative for the data signal (U) to be converted and (ii) applying to consecutive disjunct partial input symbol sequences ($IB^p$) of a number of p consecutive input symbols (IBj) covering said input symbol stream (IB), a distribution matching process (DM) to generate and output a final output symbol stream (OB) or a preform thereof, wherein the distribution matching process (DM) may be formed by a (Continued)

preceding shell mapping process (SM) and a succeeding amplitude mapping process (AM), wherein said shell mapping process (SM) may be configured to form and output to said amplitude mapping process (AM) for each of said consecutive partial input symbol sequences ($IB^p$) a sequence ($s^q$) of a number of q shell indices (s), and wherein said amplitude mapping process (AM) may be configured to assign to each shell index (s) a tuple of amplitude values.

22 Claims, 10 Drawing Sheets

(56) References Cited

OTHER PUBLICATIONS

Blahut, Richard E., "Computation of Channel Capacity and Rate-Distortion Functions," *IEEE Transactions on Information Theory* (Jul. 1972), vol. 18, No. 4, pp. 460-473.

Böcherer et al., "Bandwidth Efficient and Rate-Matched Low-Density Parity-Check Coded Modulation," *IEEE Transactions on Communications* (Dec. 2015), vol. 63, No. 12, pp. 4651-4665.

Böcherer et al., "Block-to-Block Distribution Matching," *arXiv: 1302.1020* (Feb. 5, 2013), 5 pages.

Böcherer, Georg, "Capacity-Achieving Probabilistic Shaping for Noisy and Noiseless Channels," a doctoral dissertation presented to Rheinisch-Westfälischen Technischen Hochschule Aachen, Feb. 13, 2012.

Buchali et al., "Rate Adaptation and Reach Increase by Probabilistically Shaped 64-QAM: An Experimental Demonstration," *Journal of Lightwave Technology* (Apr. 1, 2016), vol. 34, No. 7, pp. 1599-1609.

Eyuboglu, et al., "Advanced Modulation Techniques for V.Fast," *European Transactions on Telecommunications and Related Technologies* (1993), vol. 4, No. 3, pp. 243-256.

Kschischang, Frank R., "Optimal Nonuniform Signaling for Gaussian Channels," *IEEE Transactions on Information Theory* (May 1993), vol. 39, No. 3, pp. 913-929.

Schulte et al., "Constant Composition Distribution Matching," *IEEE Transactions on Information Theory* (Jan. 2016), vol. 62, No. 1, pp. 430-434.

Sterian, et al., "Reducing the peak and average power for ODFM systems using QAM by constellation shaping" *European Transactions on Telecommunications* (Apr. 28, 2009), vol. 21, pp. 35-49.

* cited by examiner

Fig. 12 - Table 1

| Shell index s | $A_r$ | $A_i$ | Label $A_r$ | Label $A_i$ | $w_s$ |
|---|---|---|---|---|---|
| 0 | 1 | 1 | 1 | 1 | 2 |
| 1 | 1 | 3 | 1 | 0 | 10 |
| 2 | 3 | 1 | 0 | 1 | 10 |
| 3 | 3 | 3 | 0 | 0 | 18 |

Fig. 13 - Table 2

| | b=0 | b=1 |
|---|---|---|
| $P_{B_1}(b)$ | 0.5000 | 0.5000 |
| $P_{B_2}(b)$ | 0.0248 | 0.9752 |
| $P_{B_3}(b)$ | 0.7224 | 0.2776 |

Fig. 14 - Table 3

| q | q | rate p/q | sequence set | marginal shell index distribution $P_S$ |
|---|---|---|---|---|
| 16 | 0 | 0 | all index 0 sequence | $P_S(0) = 1$ |
| 16 | 1 | 1/16 | all index 0 sequence and one sequence with one index 1 | $P_S(1) = \dfrac{1}{2^1 \cdot 16} = \dfrac{1}{32}$ , $P_S(0) = \dfrac{31}{32}$ |
| 16 | 5 | 5/16 | all index 0 sequence, 16 sequences with one index 1, 15 sequences with one index 2 | $P_S(2) = \dfrac{15}{2^5 \cdot 16} = \dfrac{15}{512}$ , $P_S(1) = \dfrac{16}{512}$ , $P_S(0) = \dfrac{512 - 15 - 16}{512} = \dfrac{481}{512}$ |

METHODS OF CONVERTING OR RECONVERTING A DATA SIGNAL AND METHOD AND SYSTEM FOR DATA TRANSMISSION AND/OR DATA RECEPTION

The present invention refers to methods for converting or reconverting a data signal and to a method and a system for data transmission and/or data reception.

In the field of converting, transmitting and/or receiving data signals over certain kinds of channels in order to communicate symbol sequences a certain degree of power consumption is accompanied with the underlying processes.

The publication "Bandwidth efficient and rate-matched low-density parity-check coded modulation" (IEEE transactions on communications, volume 63, number 12, pages 4651 to 4665) discloses a coded modulation scheme, wherein at a transmitter side a concatenation of a distribution matcher and a systematic binary encoder performs a probabilistic signal shaping and channel coding.

The publication "Reducing the peak and average power for OFDM systems using QAM by constellation shaping" (European transactions on telecommunications, volume 21, pages 35 to 49, 2010) refers to a scheme for reducing the peak and the average power of orthogonal frequency division multiplexing signals using quadrature amplitude modulation by constellation shaping.

The publication "Advanced modulation techniques for V.Fast" (European transactions on telecommunications and related technologies, volume 4, number 3, pages 243 to 255) teaches a modulation technique including adaptive bandwidth operation for automatically selecting a transmission band, multi-dimensional trellis coded modulation for higher coding gain, constellation shaping for higher shaping gain, pre-coding and pre-emphasis of advanced equalization, as well as warping for resistance against signal-dependent impairments.

It is an object underlying the present invention to present methods of converting or reconverting data signals and methods and systems for data transmission and/or data reception with an increased reliability of the underlying processes under reduced power consumption or at least improved power efficiency.

The object underlying the present invention is achieved by a method for converting a data signal according to independent claim 1 or alternatively by a method according to independent claim 5, by a data reception system according to dependent claim 12 and by a data collection system according to dependent claim 22. Preferred embodiments are further defined in the respective dependent claims.

According to a first aspect of the present invention a method for converting a data signal is provided which comprises processes of providing an input symbol stream of input symbols, the input symbol stream being representative for the data signal to be converted and applying to consecutive disjunct partial input symbol sequences of a number of p consecutive input symbols covering said input symbol stream, with p being a fixed natural number, a distribution matching process in order to generate and output a final output symbol stream or a preform thereof.

According to the present invention the distribution matching process is formed by a preceding shell mapping process and a succeeding amplitude mapping process. Said shell mapping process is configured in order to form and output to said amplitude mapping process for each of said consecutive partial input symbol sequences a sequence of a number of q shell indices, with q being a fixed natural number. Said amplitude mapping process is configured to assign to each shell index a tuple of amplitude values.

In the sense of the present invention a symbol may be referred to as a bit sequence. However, this is not mandatory, and alternative symbol representations may be used.

It is therefore a key aspect of the present invention to combine within a distribution matching process a shell mapping process followed by an amplitude mapping process in order to derive from an input symbol stream a stream of shell indices first and to derive therefrom a stream of amplitude values. With such a combination of processes it is possible to design the shell indices in a manner in order to fulfill certain efficiency and power requirements on the one hand, wherein the provision of the stream of pairs of amplitude values allows a simple and efficient combination with forward error correction processes.

The shell mapping process may be configured in order to output shell indices from an assigned index set. In other words, the shell mapping process, the value of each shell index, an underlying shell mapping function and/or an underlying shell weighting function may be defined in relation to an assigned index set underlying the shell mapping process.

In a preferable embodiment of the method for converting a data signal according to the present invention for an underlying M-QAM constellation with $M=2^{2m}$, with m being a fixed natural number, said index set may fulfill the following relation (1)

$$S=\{0,1,2,\ldots,smax-1\}, \qquad (1)$$

with S denoting the index set and with $smax=M/4$.

In a four-dimensional M-QAM constellation—e.g. with a dual polarization QAM scheme—one would have $smax=M/16$ for the underlying index set S.

According to a further advantageous embodiment of the method for converting a data signal said amplitude mapping process and each amplitude value may be defined by an assigned amplitude mapping function configured to map a respective shell index s to a tuple of amplitude values, wherein the amplitude values are in particular chosen according to a $2^m$-ASK constellation. This allows the definition and selection of certain efficiency and/or power requirements for a transmission/reception process to be achieved.

Under such circumstances it is of particular advantage if for an underlying M-QAM constellation with $M=2^{2m}$, with m being a fixed natural number, the constellation point amplitude pairs of said M-QAM constellation are indexed by said partial input symbol sequences.

Furtheron, constellation point indexing may be realized by using additional input, e.g. in the form of—in particular two—symbols or bits, as sign symbols or bits for defining the sign of said amplitude values for indexing the constellation point. The sign symbols or bits may be derived from the symbol or bit stream of the source and/or from parity symbols or bits after encoding when using probabilistic amplitude shaping, in the following also abbreviated by PAS. For a number of q shell indices s and a dimension t of the tuples a number t·q of sign symbols or sign bits are realized corresponding to a number t·q of amplitudes.

In order to define certain efficiency and power requirements, the underlying shell weighting function may be designed accordingly. For instance and according to a preferred embodiment of the method for converting a data signal, said shell weighting function may be configured in order to enable—in particular by means of said shell mapping function as a distribution matching function—selection of the constellation point amplitudes to be indexed by said partial input symbol sequences which have or for which the respective amplitude values have a least weight value, in particular below a given predefined threshold value.

The particular advantage of the present invention is that the method for converting a data signal according to the present invention can be used for amplitude shaping and combined with forward error correction with the probabilistic amplitude shaping or PAS schemes.

Therefore, said amplitude values or a sequence thereof may be supplied to a probabilistic amplitude shaping or PAS process in order to thereby generate and output constellation points or a sequence thereof, respectively, as a final output symbol stream being representative for the converted signal, in particular in forward error corrected form and/or by labeling said amplitude values based on a binary string scheme.

In this regard and according to an additional or alternative view of the present invention a key aspect is the combination of a shell mapping process with a probabilistic amplitude shaping approach, wherein the shell mapping process implements the required distribution matcher (DM). This is in strict contrast to prior art methods for converting data signals as for instance the above-mentioned publication "Bandwidth efficient and rate-matched low-density parity-check coded modulation" uses a so-called constant composition distribution matcher (CCDM) with arithmetic coding as a distribution matcher. However, nothing is said about the invention's aspects of how both a shell mapping process and a probabilistic amplitude shaping approach can be combined, wherein the shell mapping process implements the required distribution matcher (DM), and that said combination can be achieved by means of identifying amplitudes with the rings introduced in the original V.34 specification.

In addition, the approach of above-mentioned publication "Reducing the peak and average power for OFDM systems using QAM by constellation shaping" offers a performance in an uncoded form, i.e. without any forward error correction (FEC).

In the following this additional or alternative view of the present invention is further elucidated:

The main intention of this approach is the new combination of probabilistic amplitude shaping (PAS) with shell-mapping. In particular, according to this view of the present invention the underlying shell-mapping algorithm forms a distribution matcher (DM) for the probabilistic amplitude shaping (PAS) that allows a straightforward combination with forward error correction (FEC) methods. The latter may be designed e.g. as low-density parity-check (LDPC) or in the sense of polar codes.

Although known approaches also attempt at reducing the peak and/or the average power in data converting/reconverting and/or transmission methods, it has to be observed that these known approaches—e.g. according to document "Reducing the peak and average power for OFDM systems using QAM by constellation shaping"—do not employ any FEC code, i.e. they at most consider an uncoded transmission scenario only. Under such circumstances, the signaling schemes become very easy and sophisticated schemes like PAS are not needed. All modern, standardized communication systems, like UMTS, LTE, Wifi, 5G, DVB-S2, DVB-T2 and the like—use FEC in order to improve the system performance.

Approaches in order to combine shell-mapping with modern FEC have not been presented and embodiments of the present invention fill this gap.

In the proposed scheme, this above-described combination is realized by putting the symbols or bits representing the shell indices in the information part of a systematic encoding, whereas the generated parity symbols or bits after FEC encoding then select the points on the shells. The systematic encoding where the information part is copied in the actual codeword is important to avoid destroying the imposed shaped distribution.

According to an additional or alternative aspect of the present invention a method for reconverting an—in particular already converted—data signal is presented, which comprises processes of providing an input symbol stream of input symbols, the input symbol stream—directly or indirectly—being representative for an amplitude sequence of the underlying—in particular converted—data signal to be reconverted or a derivative thereof, and applying to said input symbol stream or to a derivative thereof an inverse distribution matching process in order to generate and output a final output symbol stream.

The inverse distribution matching process is formed by a preceding inverse amplitude mapping process and a succeeding inverse shell mapping process. Said inverse amplitude mapping process is configured to assign for tuples of amplitude values conveyed by or derived from said input symbol stream a shell index, thereby outputting to the inverse shell mapping process a sequence of shell indices. Said inverse shell mapping process is configured in order to form and output for each of the disjunct consecutive partial sequences of a number of q consecutive shell indices covering said sequence of shell indices, with q being a fixed natural number, a partial output symbol sequence of a number of p final output symbols, with p being a fixed natural number, thereby forming and outputting the (re) converted signal.

Said inverse shell mapping process and the value of each shell index may be defined by an assigned index set underlying the inverse shell mapping process and in particular an underlying shell mapping process.

Under such circumstances, for an underlying M-QAM constellation with $M=2^{2m}$, with m being a fixed natural number, said index set may fulfill the following relation (1')

$$S=\{0,1,2,\ldots,smax-1\}, \quad (1')$$

with S denoting said index set and with smax=M/4.

In a four-dimensional M-QAM constellation—e.g. with a dual polarization QAM scheme—one would have smax=M/16 for the underlying index set S.

Said inverse amplitude mapping process and each shell index value may be defined by an assigned underlying amplitude mapping process, in particular in connection with its underlying amplitude mapping function configured to invertibly map a respective shell index s to a tuple of amplitude values, wherein the amplitude values are in particular chosen according to a $2^m$-ASK constellation.

Again, for an underlying M-QAM constellation with $M=2^{2m}$, with m being a fixed natural number, an underlying indexing of the constellation point amplitudes of said M-QAM constellation is reinstantiated by disjunct consecutive partial output symbol sequences of p consecutive final output symbols with p being a fixed natural number.

The constellation point indexing may be realized by using—in particular two—symbols or bits as sign symbols or bits for defining the sign of said amplitude values and by using the remaining symbols or bits of each of said partial output symbol sequences for indexing the constellation point amplitudes, particularly using an M-QAM scheme. This may in particular be done in a gray code labeled form and/or as a Cartesian product of two identical $\sqrt{M}$-ASK schemes. The sign symbols or bits may be derived from the symbol or bit stream of the source and/or from parity symbols or bits after encoding when using PAS.

Additionally or alternatively, said underlying shell mapping function as a distribution function and/or the underlying shell weighting function may be configured in order to convey selection of the constellation point amplitudes to be indexed by said partial output symbol sequences which have or for which the respective amplitude values have a least weight value, in particular below a given predefined threshold value.

Said amplitude values or a sequence thereof may preferably be obtained from a preceding inverse probabilistic amplitude shaping or PAS process evaluating input constellation points or a sequence thereof, respectively, as said input symbol stream being representative for the signal to be reconverted, in particular in forward error corrected form and/or by delabeling said amplitude values based on a binary string scheme.

In the following further aspects of the present invention are discussed referring to both the method for converting as well as to the method for reconverting a data signal.

Said distribution matching process, said inverse distribution matching process, said shell mapping process, said inverse shell mapping process, said amplitude mapping process, said inverse amplitude mapping process, said probabilistic amplitude shaping process and/or said inverse probabilistic amplitude shaping process may respectively be configured to be invertible, in particular with respect to each other. This helps to increase the efficiency of the underlying processes as the invertible character of each respective process ensures a one-to-one mapping of the respective symbol sequences.

It is not obvious that an inverse exists for all inputs and that reverting the respective operation does not result in impairments on subsequent steps. For instance, in usual approaches the FEC encoder is located before the shaping device, PAS reverses this order and prevents error propagation to the decoder.

The process of providing the input symbol stream may comprise at least one of recalling the input symbol stream from a storage medium or from a symbol generation process, and receiving, demodulating and/or decoding a signal being representative for or conveying the input symbol stream.

In order to more reliably achieve certain efficiency and power requirements, in preferred embodiments of the methods for converting or reconverting a data signal said distribution matching process, said inverse distribution matching process, said shell mapping process, said inverse shell mapping process, set amplitude mapping process, said inverse amplitude mapping process, said probabilistic amplitude shaping process, said inverse probabilistic amplitude shaping process, the underlying shell mapping function f, the shell weighting function w, the amplitude mapping function g, the inverse shell mapping function $f^{-1}$ and/or the inverse amplitude mapping function $g^{-1}$ may respectively be at least one of based on and chosen (a) according to a predefined distribution to be achieved for an output and in particular based on a Gaussian distribution and (b) in order to achieve an approach of the empirical distribution of the final output symbol sequence to the respective underlying distribution by accordingly indexing the respective output sequences out of a respective entire set of candidates.

The present invention may be applied in connection with general symbols forming the respective signals to be converted or reconverted and as also any intermediate signal may be represented by general symbols. In particular, according to a preferred embodiment of the methods for converting or reconverting a data signal according to the present invention said input symbol stream, said shell indices, said amplitude values may be at least partially formed and/or represented by binary bits.

The present invention may be applied in the context of more concrete forms of symbols.

Therefore, in some practical applications the inventive method may focus on symbols in the form of binary digits, i.e. bits. Thus and according to the present invention and in certain embodiments thereof the terms input symbol stream, partial symbol sequence, symbol distribution matching process, final output symbol stream and the like may be focused on symbols in the form of bits thereby replacing these mentioned regular terms by respective specialized technical terms of input bit stream, partial bit sequence, bit distribution matching process, final output bit stream and the like, respectively.

Each stage and even intermediate stages of the process according to the present invention may refer to bits and bit combinations as symbols.

According to another aspect of the present invention a method for data transmission and/or data reception is provided.

The inventive method comprises at least one of a data transmission section and a data reception section. The data transmission section and/or the data reception section may involve at least one of the inventive methods for converting a data signal or for reconverting a data signal as described above.

In a preferred embodiment of the inventive method for data transmission and/or data reception, the distribution matching process and the inverse distribution matching processes may be inverse with respect to each other.

In particular, the involved shell mapping and amplitude mapping processes and inverse shell mapping and the inverse amplitude mapping processes—respectively forming the distribution and the inverse distribution matching process—may be inverse with respect to each other, respectively.

Additionally or alternatively, the probabilistic amplitude shaping process and the inverse probabilistic amplitude shaping process may be inverse with respect to each other.

A data transmission and/or data reception system is suggested by the present invention, too. The inventive system comprises a processing unit configured to perform any of the methods according to the present invention and comprises respective means for carrying out such methods.

In case of a combination of a transmission process/unit and a reception process/unit, these processes or units may be configured to exchange and/or negotiate data in order to define and fix the concrete form of the shell mapping, the amplitude mapping and/or the probabilistic amplitude shaping properties. In particular, the input and the output lengths p and q, respectively, the underlying shell mapping function f and the shell weighting function w and/or the assigned index set S are negotiated.

Furtheron, the inventive methods as described above may be realized by a code acceptable and executable by a computer or a digital signal processing means.

Also within the scope of the present invention, a computer program product is provided, comprising a computer code adapted to let a computer and/or a digital signal processing means execute any of the methods according to the present invention when the code is run on the computer and/or the digital signal processing means, respectively.

These and further aspects, details, advantages and features of the present invention will be described based on embodiments of the invention and by taking reference to the accompanying figures.

Figure 2:
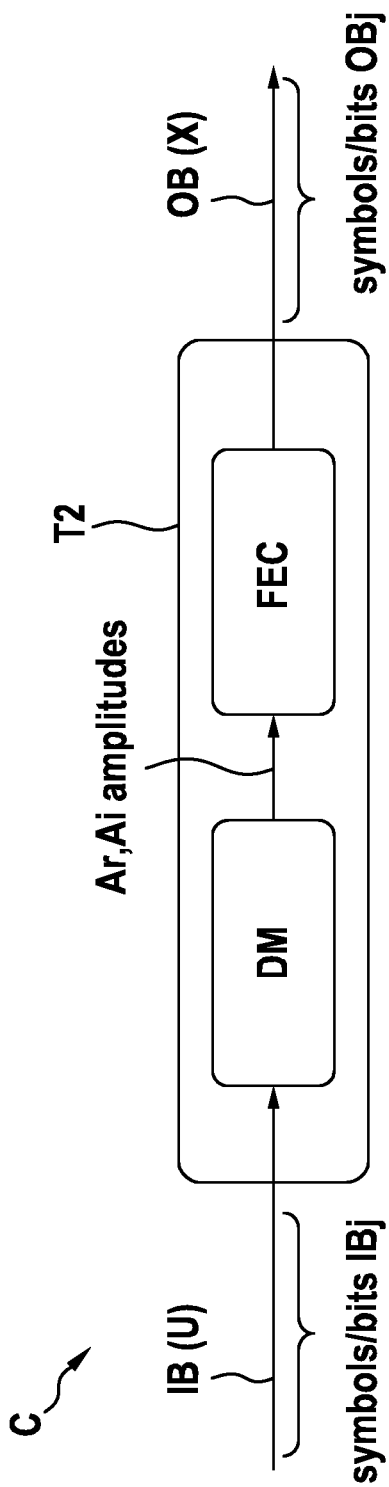
FIGS. 2 to 4 show block diagrams elucidating general aspects of the method for converting a data signal according to the present invention. In particular.

FIG. 2 conveys a schematic block diagram for elucidating a preferred embodiment of an encoding process or unit T2.

Figure 3:
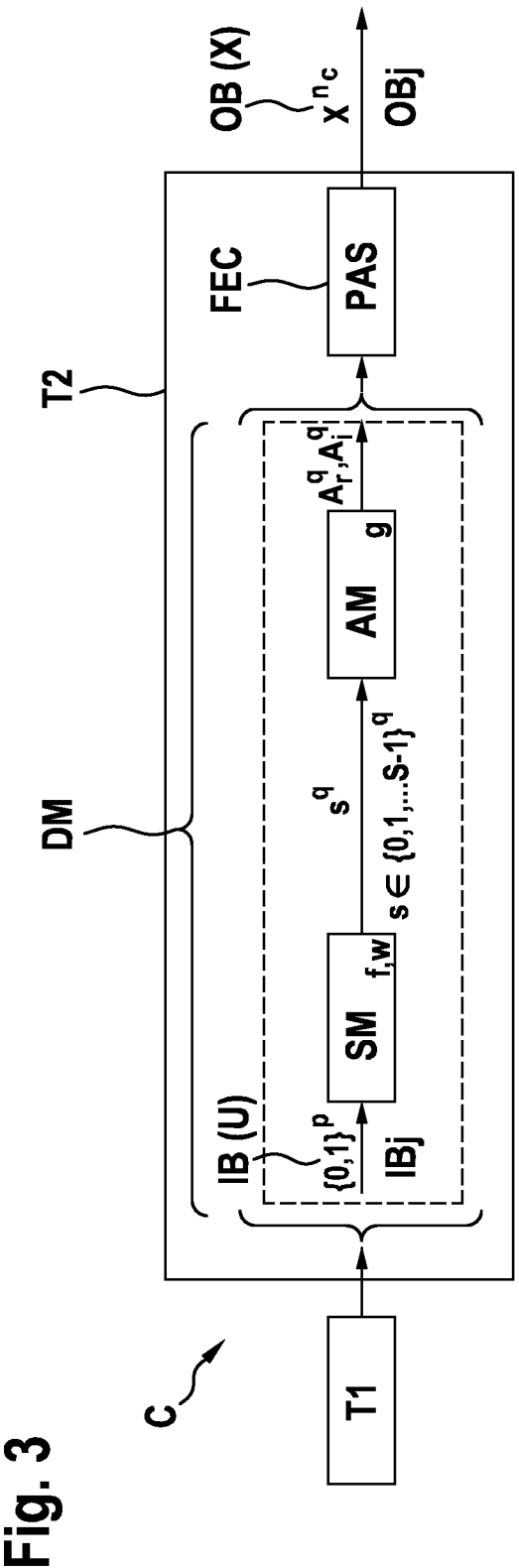

FIG. 3 shows a schematic block diagram elucidating an embodiment of the configuration for an encoding process or unit T2 of FIG. 2.

Figures 4, 5:
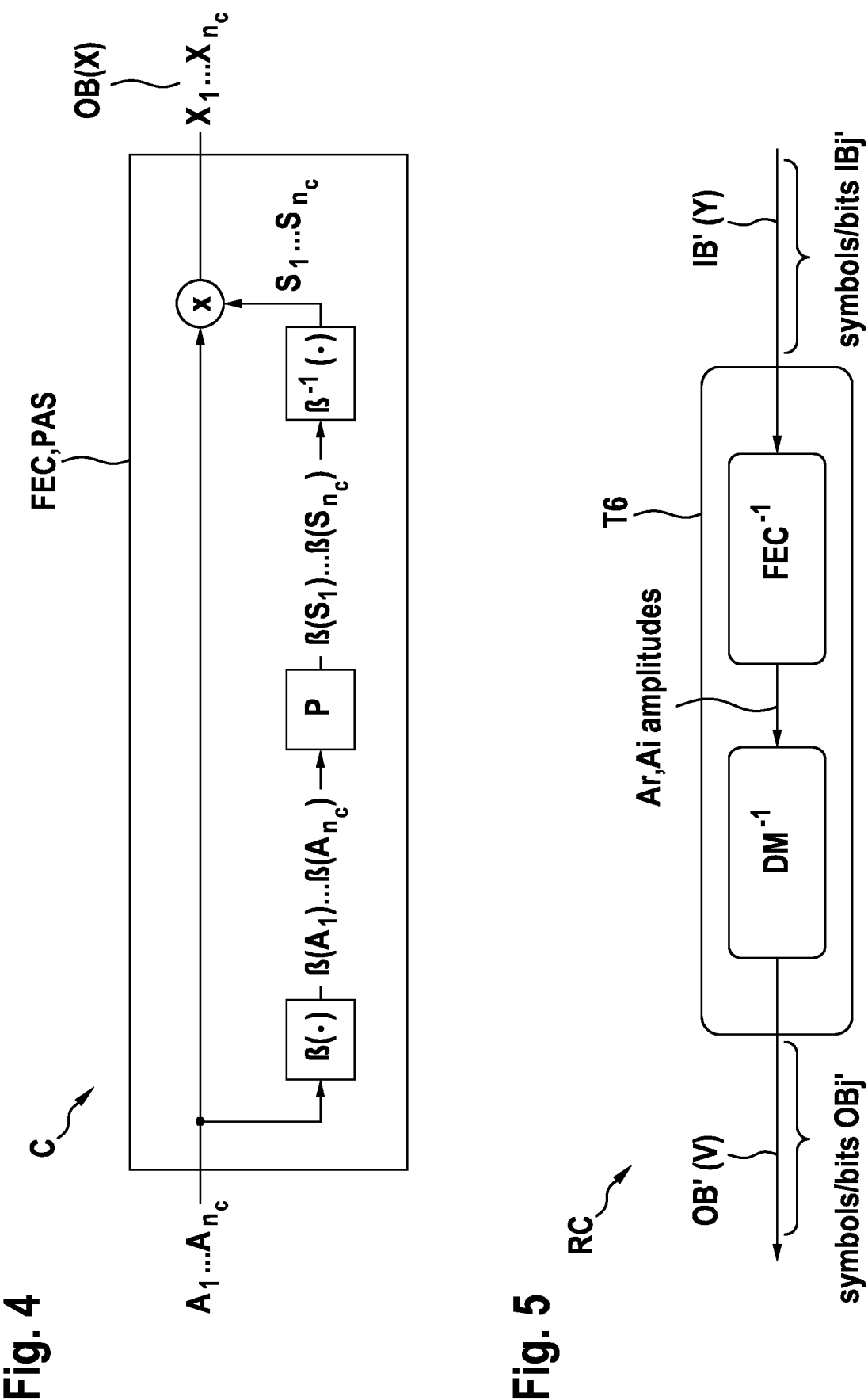

FIG. 4 is a block diagram describing an error correction branch of a probabilistic amplitude shaping process or unit PAS.

FIG. 5 shows a block diagrams elucidating general aspects of the method for reconverting a data signal according to the present invention.

Figure 6:
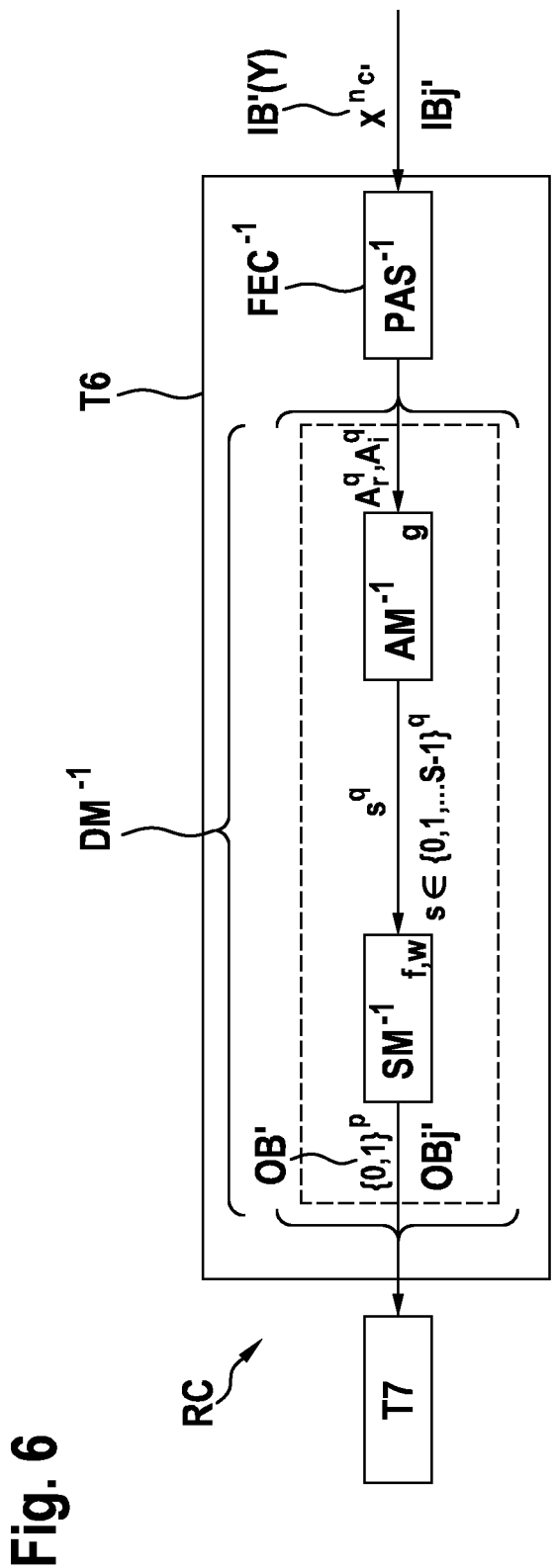

FIG. 6 shows an alternative block diagram elucidating general aspects of the method for reconverting a data signal according to the present invention.

Figure 7:
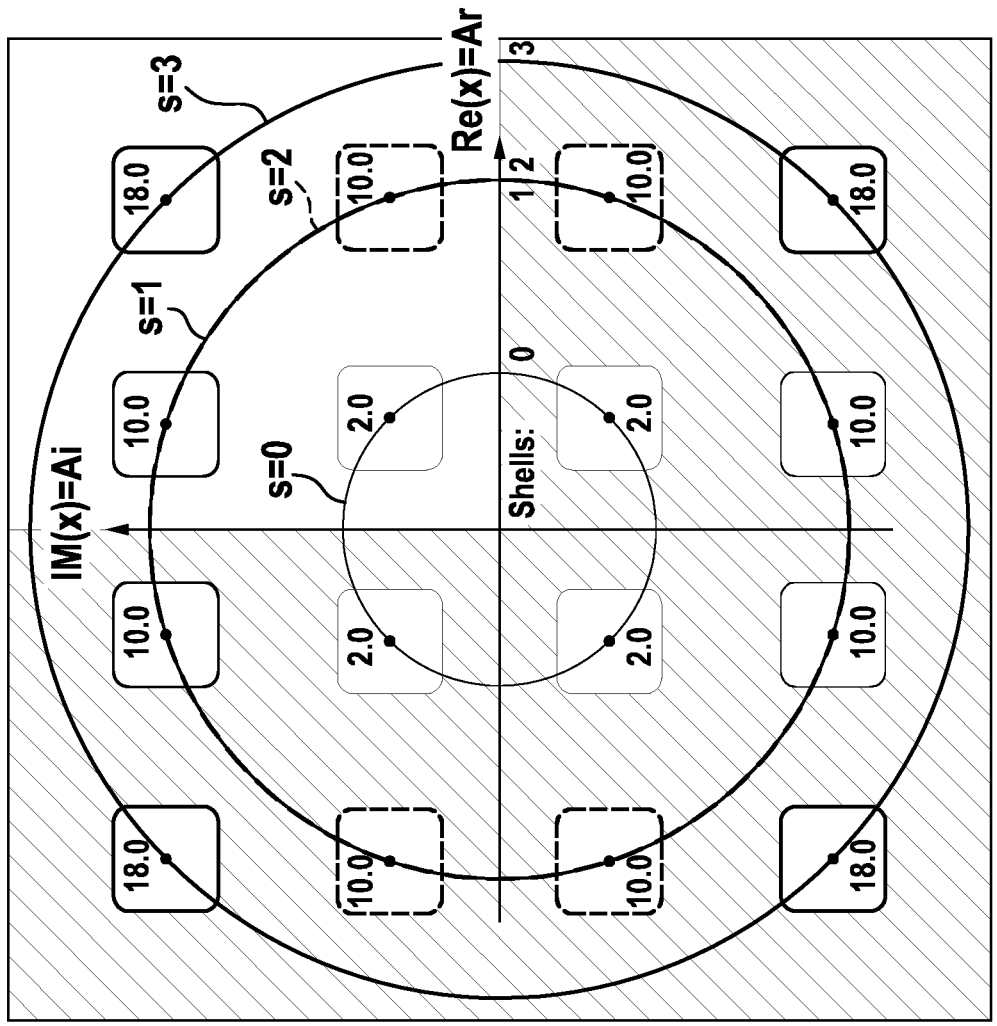

FIGS. 7 to 14 exemplify aspects of concrete embodiments of the method for converting a data signal according to the present invention. In particular:

FIG. 7 shows a diagram for elucidating a 16-QAM configuration.

Figure 8:
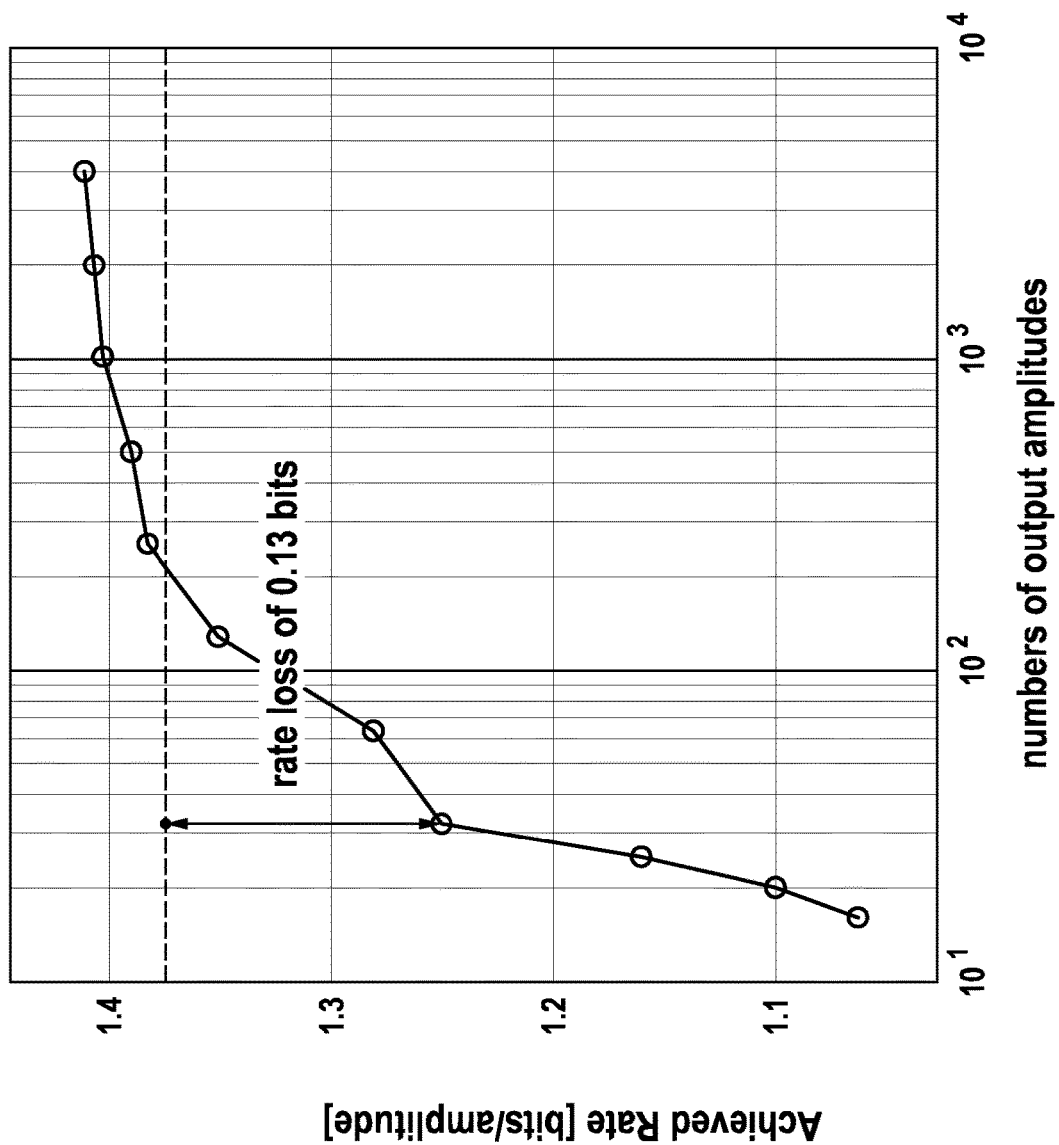

FIG. 8 gives a graphical representation describing a comparison of the matcher rates for the inventive SMDM and the conventional CCDM.

Figure 9:
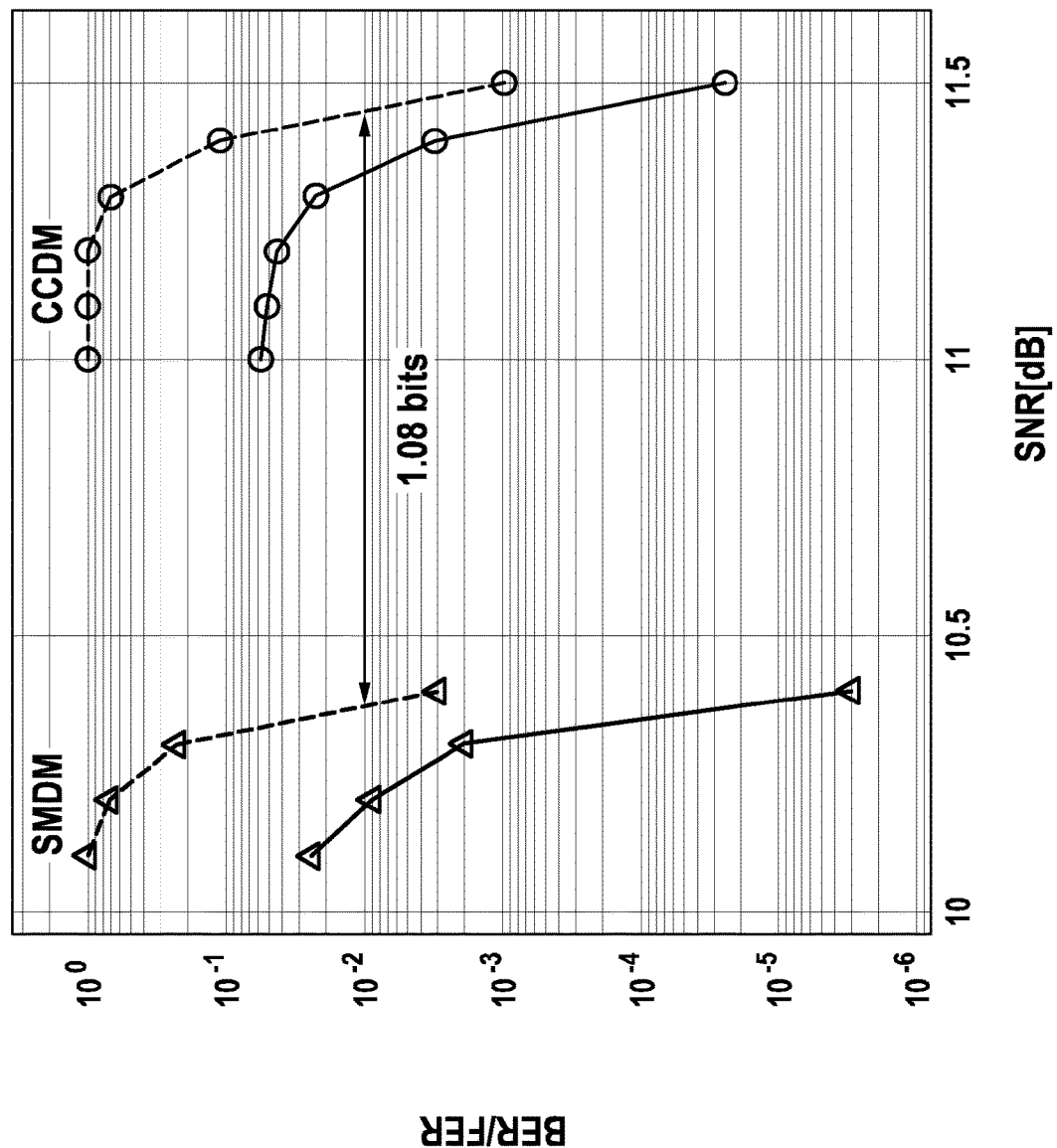

FIG. 9 shows a graphical representation describing an analysis of the coded system performance of the scenario depicted in FIG. 8.

Figure 10:
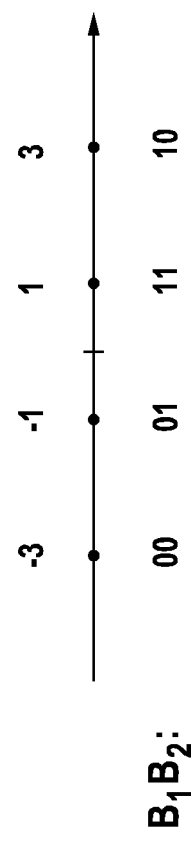

FIG. 10 gives a graphical representation describing a label assignment of a 4-ASK example with two bits.

Figure 11:
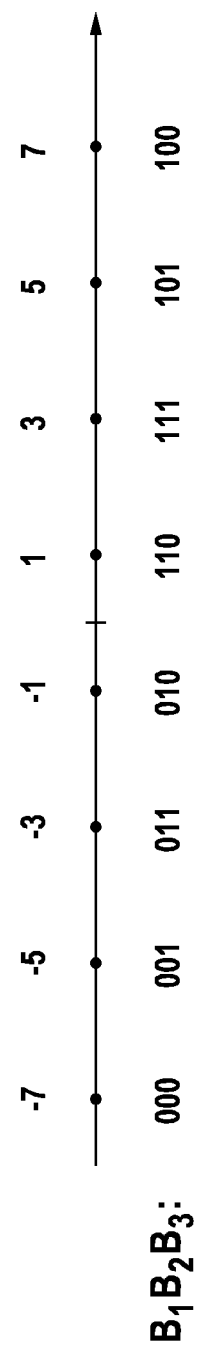

FIG. 11 gives a graphical representation describing a label assignment of a 4-ASK example with three bits.

FIG. 12 shows a lookup table exemplifying an assignment between shell indices, amplitudes, and amplitude labels.

FIG. 13 shows a table for the distribution of certain bits.

FIG. 14 shows a table elucidating marginal shell index distributions.

In the following embodiments and the technical background of the present invention are presented in detail by taking reference to accompanying FIGS. 1 to 14. Identical or equivalent elements and elements which act identically or equivalently are denoted with the same reference signs. Not in each case of their occurrence a detailed description of the elements and components is repeated.

The depicted and described features and further properties of the invention's embodiments can arbitrarily be isolated and recombined without leaving the gist of the present invention.

Figure 1:
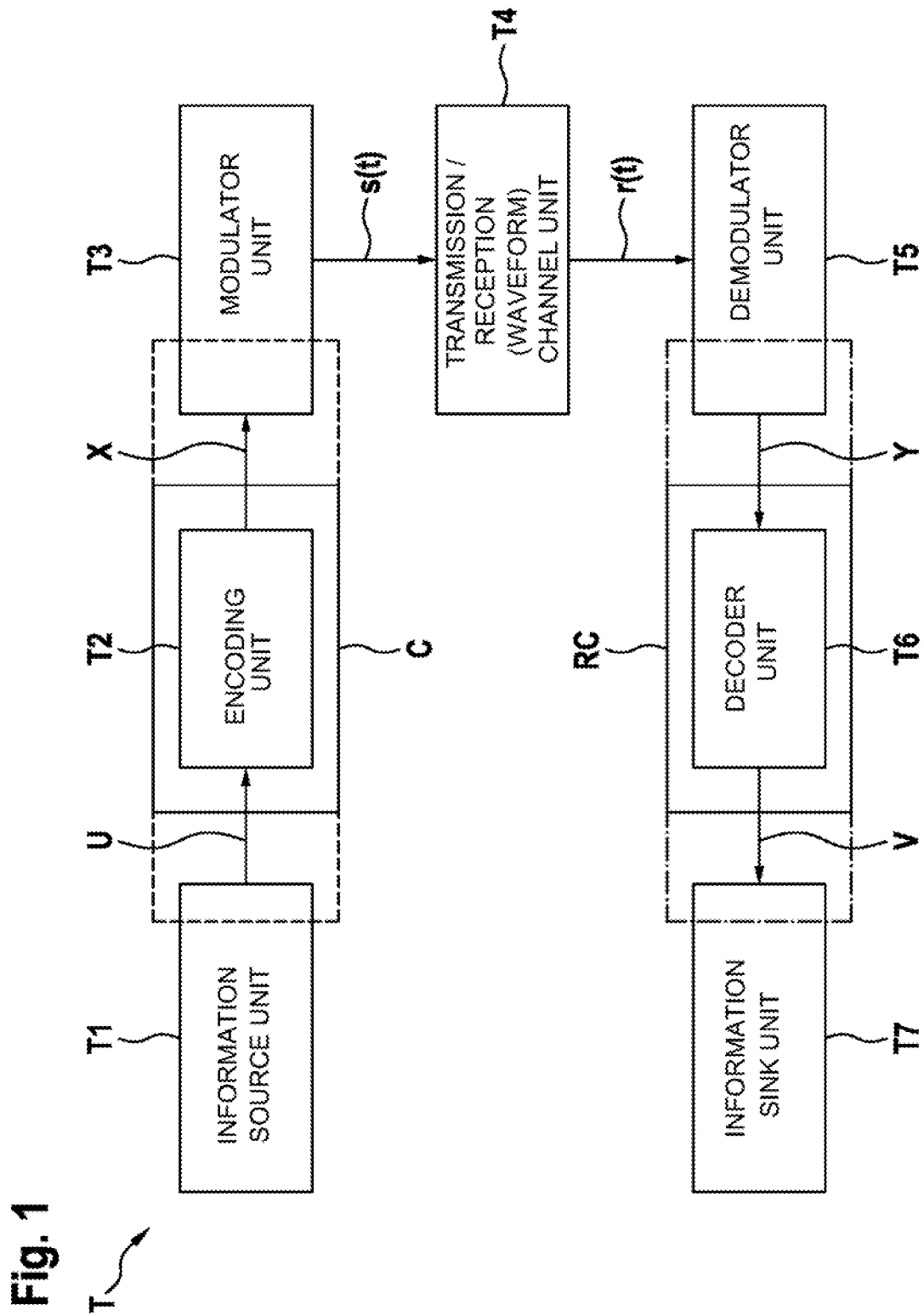
FIG. 1 shows a block diagram for elucidating embodiments of a data transmission and/or data reception system according to the present invention and the embedding of the methods for converting/reconverting a data signal embedded therein.

Before going into detail with respect to aspects of the methods for converting/reconverting a data signal and the methods for data transmission/reception reference is taken to FIG. 1 and its general view on systems and methods for data conversion/reconversion and/or data transmission/reception.

Therefore, FIG. 1 shows a block diagram for elucidating embodiments of a data transmission and/or data reception system according to the present invention and the embedding of the methods for converting/reconverting a data signal embedded therein.

The scheme according to FIG. 1 generally follows the concept of coding and modulation in digital communication proposed in 1974 by Massey.

The scheme of FIG. 1 discloses a system T—being it a hardware structure, a configuration of a method or of processing units or a combination thereof—comprising (i) an information source unit T1 configured to provide a signal U to be converted and transmitted, an (ii) encoding unit T2 configured to receive and encode the signal U and to output an encoded signal X, (iii) a modulator unit T3 configured to receive and modulate the encoded signal X and to output a modulated signal s(t) for transmission over (iv) a transmission/reception waveform channel unit T4, (v) a demodulator unit T5 configured to receive the modulated signal s(t) in a form r(t) possibly distorted by the transmission channel unit T4 and to demodulate said signal in order to output a demodulated signal Y, (vi) a decoder unit T6 configured to receive and decode the demodulated signal Y and to output the decoded signal V, and (vii) an information sink unit T7 configured to receive the decoded signal V.

According to the present invention, the information source T1 and the information sink T7 may be any kind of information or signal sink or source, respectively. Any kind of storage medium may be used. Alternatively, any arbitrary other transmitting/receiving channel may be involved.

As already mentioned above, according to the present invention a method C for converting a data signal U and alternatively or additionally a method RC for reconverting a data signal Y are provided. These methods C and RC according to the present invention may embrace or be a part of the information encoding unit T2 and decoding unit T6, respectively. Additionally or alternatively, parts of the information source unit T1 and/or of the modulator unit T3 on the one hand and of the demodulator unit T5 and/or of the information sink unit T7 on the other hand may be realized, too.

FIGS. 2 to 4 elucidate by means of block diagrams general aspects of the method C for converting a data signal U according to the present invention.

The data signal U obtained from an information source unit T1 in the case shown in FIGS. 1 to 4 is represented by or identical to an input symbol stream IB which is not necessarily but may be a stream of binary input digits or input bits IBj. The input symbol stream IB may have a finite length or may be represented as a continuous flow of symbols.

FIG. 2 elucidates by means of a schematic block diagram a preferred embodiment of an encoding process or unit T2 realizing an aspect of the present invention.

An input symbol or bit stream IB being representative for a signal or data signal U to be converted and comprising this stream of input symbols or input bits IBj is provided to the encoding process or unit T2. The encoding process or unit T2 is configured to process the input symbols or bits IBj in order to generate and output an output symbol stream OB which is representative to the converted signal X shown in FIG. 1 and comprising a stream of output symbols or output bits OBj.

In the QAM embodiment shown in FIG. 2 the encoding process or unit T2 is formed by a first or preceding distribution matching process or unit DM configured to generate from said input symbols or bits IBj a sequence of amplitude pairs Ar, Ai and a second or succeeding forward error correction process FEC. The distribution matching process or unit DM is configured to generate the amplitudes in a way suitable for the succeeding forward error correction process or unit FEC.

This is one key advantage of the present invention and can in particular be achieved by using a configuration for the distribution matching process or unit DM as shown for instance in FIG. 3.

FIG. 3 shows a schematic block diagram showing an embodiment of the configuration for the encoding process or unit T2 of FIG. 2.

Again, a source T1 supplies an input symbol or bit stream IB being representative for a data signal U to be converted. The input symbol or bit stream IB with individual input symbols or bits IBj enters the distribution matching process or unit DM which is formed by a preceding shell mapping process or unit SM and a succeeding amplitude mapping process or unit AM.

The shell mapping process or unit SM is configured to generate from the input symbol stream IB from disjunct and consecutive partial sequences IBp of its individual input symbols IBj of length p, with p being a fixed natural number, a sequence of shell indices s obtained from a shell index set S.

For an M-QAM configuration with $M=2^{2m}$ and m being a fixed natural number, the set S of shell indices may take the form $S=\{0, 1, 2, \ldots, smax-1\}$, with $smax=M/4$.

The sequence of shell indices s is provided to the following amplitude mapping process or unit AM which is in particular based on an amplitude mapping function g which is configured in order to derive from the sequence of shell indices s a sequence of said amplitude pairs Ar and Ai which are then fed into the forward error correction process or unit FEC.

In the case shown in FIG. 3 the forward error correction process or unit FEC is formed by a so-called probabilistic amplitude shaping process or unit PAS and configured to generate and output based on the sequence of amplitude values a sequence of output symbols or bits OBj of the output symbol or bit stream OB which are also denoted by $X^{n_c}$ in FIG. 3.

FIG. 4 elucidates in more detail the error correction branch of the probabilistic amplitude shaping process or unit PAS as described in more detail below.

FIGS. 5 and 6 elucidate a method for reconverting a data signal Y by the underlying inverted processes performed by the decoder process or unit T6 as shown in FIG. 1.

In this case, the input symbol or bit stream IB' of individual input symbols or bits IBj', which are also denoted by $X^{n_{c'}}$ in FIG. 6 and which are representative for the data signal Y to be converted, is fed to the preceding inverted probabilistic amplitude shaping process or unit $PAS^{-1}$ for performing forward error correction and outputting into the inverse distribution matcher $DM^{-1}$ a sequence of amplitude values.

In the inverse distribution matcher $DM^{-1}$ an inverse amplitude mapping process or unit $AM^{-1}$ receives the sequence of amplitude values and generates therefrom a sequence of shell indices s, feeding the same into a following inverse shell mapping process or unit $SM^{-1}$ in order to generate and output a sequence OB' of individual output symbols or bits OBj' being representative for the reconverted signal V and possibly fed into the sink T7.

As described in more detail below, FIG. 7 demonstrates a shell configuration for the 16-QAM configuration with three shells with indices s=0, 1, 2, 3, wherein the values shown in the boxes are representative for the respective value of the shell weighting function w which in this case corresponds to the (squared) Euclidean metric or norm of the respective constellation points shown in the diagram of FIG. 7 when compared to the origin.

FIGS. 8 to 13 describe further details of embodiments of the present invention as elucidated in the following.

In the following, these and additional aspects, features and/or properties of the present invention will be further elucidated:

The presented invention generally relates to communication methods and systems and more particularly to techniques for generating sequences of symbols—e.g. from which constituting signals are to be transmitted—with desired distributions. Thereby, it is possible to realize data transmission and reception with an increased degree of efficiency at reduced power requirements.

In order to achieve a power efficient communication—for instance over noisy channels—symbols to be transmitted within a signal should follow a certain distribution. In order to achieve this, data bits or more general data symbols need to be mapped to a symbol sequence with a desired distribution. The mapping should be invertible, so that the original data symbols or bits can be recovered from the symbol sequence, for instance after the transmission and reception at a reception side.

Devices configured to realize such a mapping of original uniformly distributed symbols or bits to a desired distribution of symbols or bits are called distribution matchers.

The presented invention particularly focuses on spectrally efficient signal transmission.

In order to achieve spectrally efficient communication over noisy channels, constellation shaping techniques impose a certain distribution on the transmitted symbols. Constellation shaping has recently received much interest from industry, especially for fiber-optic communications.

The present invention in particular describes that probabilistic amplitude shaping or PAS can be combined with shell mapping as or as part of a distribution matcher DM in order to increase the transmission efficiency.

In the following, this may also be referred to as shell mapping distribution matching or SMDM. SMDM allows pipelining and works for small block lengths.

Therefore it is suitable for very high throughput implementation on chips or the like.

Probabilistic amplitude shaping may use constant composition distribution matching in order to create signaling sets whose amplitudes follow a shaped, i.e., non-uniform, distribution. For that purpose, CCDM employs arithmetic coding to index permutations of a sequence with the desired symbol distribution.

This approach has two drawbacks:
CCDM only works well for long output sequences.
Arithmetic coding is a sequential approach that does not allow parallelization in a straightforward manner.

Shell mapping is a method which is configured to obtain higher shaping gains than the previously known trellis shaping. It may therefore be applied in the V.34 modem standard, where it can be combined with trellis coded modulation or TCM. Here, a part of the information bits is sent through a convolutional encoder to obtain the input bits for the shell mapping device SM.

The shell mapper SM outputs a sequence of shells or shell indices which all carry the same number of constellation points, for instance of an underlying M-QAM constellation. The remaining information bits are passed uncoded and choose the points on the respective shell, implementing the TCM paradigm of set partitioning.

This invention inter alia suggests using a shell mapping process or unit SM as a distribution matcher SMDM or as a part thereof, in particular for probabilistic amplitude shaping or PAS.

The suggested approach has the following advantages:

SMDM inherits all advantages of the shell mapping algorithm SM as such:
- It is highly parallelizable and therefore allows for parallelizable and pipelinable distribution matching DM as well, in contrast to CCDM, which is a sequential algorithm.
- By design, it is suited for small to moderate output lengths, in contrast to CCDM, which requires long output lengths to work well.

SMDM inherits all advantages of the PAS process:
- It can be used with any binary FEC scheme—e.g. with LDPC, Turbo and Polar codes—and is not limited to $1/(l+1)$ convolutional codes. A simple one-dimensional demapper suffices and decoding may be performed with a bit-wise metric where the decoder is informed about the outer code (imposed by the shell mapping) by the priors of the non-uniform bits. Hence, this reverse concatenation of shaping and FEC encoding avoids the use of a deshaping operation prior to decoding.
- It allows rate adaptation with fine granularity.

Probabilistic Amplitude Shaping (PAS)

Probabilistic amplitude shaping or PAS allows combining probabilistic shaping with forward error correction or FEC.

The PAS concept is illustrated in FIG. 4 for reference.

The PAS process takes as input $n_c$ amplitude values Aj, $j=1, \ldots, n_c$ or pairs thereof selected from a discrete set A of amplitude values having a cardinality card(A).

These amplitude values Aj are then labeled using a $\log_2(\text{card}(A))$-bit binary string and encoded using a binary systematic FEC encoder of desired rate and block length $n_c \cdot \log_2(\text{card}(A))+1)$ bits so that the binary representation of the amplitudes Aj is copied into the information part of the systematic codeword.

The corresponding check bits are mapped into signs which are then multiplicated with the amplitudes so that the final constellation points Xj are obtained.

The shell mapping process or unit SM according to the present invention is configured to constitute the device that maps the string of uniform input bits to an amplitude sequence.

Shell Mapping as Distribution Matcher (SMDM)

In the following, we consider two-dimensional M-QAM constellations with $M=2^{2m}$. As these can be constructed as the Cartesian product of two identical $\sqrt{M}$-ASK constellations, the explanations of the preceding section still hold.

The only difference is that for each QAM constellation point two amplitude values Ar, Ai within the set $\{1, 3, \ldots, \sqrt{M}-1\}$ are needed to represent the amplitude of the real and imaginary part, Ar and Ai respectively. Accordingly, also two sign bits are needed and the remaining $m-2$ bits can be used for the binary labeling of the amplitude values.

Considering their squared sum $Ar^2+Ai^2$ gives rise to the notion of a shell.

Obviously, we obtain a number of $smax=(\sqrt{M}/2)^2=M/4=2^{2m-2}$ such shells, which may coincide.

This is inter alia illustrated in FIG. 7, where we show the scenario for M=16.

We observe that each of the four shells with indices s=0, 1, 2, 3 has four points and that the s=1 and the s=2 shells lie on top of each other.

We associate each shell index s in the set $\{0, 1, \ldots, smax-1\}$ with a specific weight $w_s$ that is equal to the squared sum of the amplitudes Ar and Ai of the real and imaginary parts, respectively.

The binary representation of the amplitudes e.g. may follow a label assignment of the 4-ASK example as shown in FIGS. 10 and 11, wherein bit $B_2$ represents the amplitude and bit B1 distinguishes the sign.

The combination with a PAS—e.g. referred to as a black box—is depicted e.g. in FIG. 3:

(1) The shell mapper SM takes p uniform input bits IBj and outputs a length q sequence $s^q$ of shell indices in the set $\{0, 1, \ldots, smax-1\}$.

As parameters, only the input and output sizes p, q, the shell weighting function w, and assigned index set S are needed to be known and in particular exchanged to a receiving site. For the QAM situation the rate of the matching operation is given as $p/(2q)$. It has the unit bits/amplitude.

(2) Using a pre-computed lookup table of the form shown in Tab. 1, each shell index is mapped to a pair of constellation point amplitudes of the real and imaginary part of a constellation point.

(3) The two amplitudes now serve as the input to a PAS encoding operation. For each amplitude pair (Ar, Ai), it provides two sign bits that choose the quadrant of the two-dimensional constellation, e.g. the non-shaded area of the $1^{st}$ quadrant in FIG. 7.

Regarding the achieved advantages, we observe the following:

For a block code of length n bits and an $M=2^{2m}$-QAM constellation, we need n/m channel uses and symbols. Using PAS with SMDM and output size of q shell indices, we can therefore arrive at a maximum parallelization factor of $n/(2 \cdot m \cdot q)$.

Future technology—Internet of Things, Industry 4.0—requires low latency designs. For communication systems, latency is predominantly determined by the length of the employed code so that short codes (and therefore short matcher output sequences) are to be preferred. As FIG. 8 reveals, shell mapping SM is clearly advantageous as compared to CCDM for a fixed rate and small output length: While shell mapping achieves a rate of 1,375 bits/amplitude at an output length of 16 shell indices, CCDM requires 200 output symbols.

As the FEC is part of PAS and shell mapping is performed before encoding, the choice of the FEC does not matter, giving rise to a versatile, low complexity shaping scheme that only requires one-dimensional bit-wise demapping and binary decoding. To derive an estimate for the $i^{th}$ transmitted bit from the current channel observation y, the binary decoder may only use the following bit-metric:

$$L_i = \underbrace{\log\left(\frac{p_{Y|B_i}(y|0)}{p_{Y|B_i}(y|1)}\right)}_{\text{channel likelihood}} + \underbrace{\log\left(\frac{P_{B_i}(0)}{P_{B_i}(1)}\right)}_{\text{prior}}.$$

Due to the second summand, the unequal distribution on the shaped bits of each bit-level is taken into account so that its estimate improves. The labeling of FIGS. 10 and 11 and the distribution for the third case in table 3 shown in FIG. 14 imposes the binary marginal distributions on each bit level as shown in table 2 of FIG. 13.

The matcher rate is given by p/(2q) bits/amplitude as a natural number and both p and q can be chosen arbitrarily as long as $2^p \leq smax^q$ such that the rate can be tuned with fine granularity. For a fixed output length q, changing the number of input bits results in the selection of shell sequences with different weights, e.g. for smaller p, sequences with lower weights are preferred, which in turn affects the marginal probability of the constellation points as shown in table 3 of FIG. 14.

For the ease of exposure, we depicted the procedure for a two-dimensional constellation. However, we note that the inventive SMDM also allows a formulation for multidimensional constellations and the introduction of virtual shells by using different shell weighting functions.

In this case, more than four points can be associated with that virtual shell, allowing additional degrees of freedom to be exploited. The integration of this more general SMDM with PAS is straightforward.

Further Observations:

FIG. 4 gives an illustration of the inventive PAS encoding procedure for a single real dimension. The function $\beta_A$ implements the mapping between the amplitudes and the $\log_2(\text{card}(A))$-bit binary labeling which may be given by a binary reflected Gray code. The matrix P is the parity-check matrix of the systematic generator matrix G=[I P] to create the parity bits. The function $\beta$ implements the parity-bit to sign conversion, i.e., $\beta_s(0)=1$ and $\beta_s(1)=-1$.

FIG. 8 gives a comparison of the matcher rates for the inventive SMDM and the conventional CCDM. The example of a 64-QAM constellation with p=44 input bits and q=16 output shell indices is considered, yielding a SMDM rate of p(2q)=1,375 bits/amplitude (dashed line). This choice implies a particular distribution on the constellation symbols and is used as a reference for the CCDM comparison. It can be observed that the CCDM matcher implementation requires an output length of 200 amplitudes to achieve the same target rate. For shorter output sequences a rate loss can be observed, e.g., 0.13 bits for an output length of 16 shell indices.

FIG. 9 demonstrates an analysis of the coded system performance of the scenario depicted in FIG. 8. A rate 3/4 DVB-S2 LDPC code is used on 8-ASK to transmit at a spectral efficiency of 1,625 bits per channel use. Both the SMDM and the CCDM have an output length of 32 amplitudes. The simulation reveals that the CCDM performance decrease because of its small output length is even larger than a simple back-of-the-envelope calculation would suggest, i.e., 1.08 dB vs. 0.13·6 dB=0.78 dB.

Shell Mapping (SM) Specification

In addition, the following observations are important, too, regarding the shell mapping or SM specification:

Input: p bits.
Output: q shell indices.
The shell mapping function f and the shell weighting function w on the assigned index set S are given with:

$$f:\{0,1\}^p \to S^q \text{ and } w:S \to R$$

and with $$w^q:S^q \to R, w^q(s^q) = \sum_{i=1}^{q} w(s_i).$$

The image $f(\{1,0\}^p)$ in $S^q$ is the set of the $2^p$ sequences in $S^q$ of least weight. This is not necessarily unique and may be chosen deterministically by the shell mapping algorithm.

At the shell mapper output, the shell indices s occur with marginal distribution $P_s$ on S defined by $$P_S(s) = \frac{\text{number of times index } s \text{ occurs in } f(\{0,1\}^p)}{\text{total number of indices in } f(\{0,1\}^p)}$$
$$= \frac{\text{number of times index } s \text{ occurs in } f(\{0,1\}^p)}{2^p \cdot q}.$$

Amplitude Mapping (AM) Specification

The amplitude set A of a $2^m$-ASK constellation is $$A=\{1,3,5,\ldots,2^m-1\},$$

with $\text{card}(A)=|A|=2^{m-1}$.

The amplitude tuples of an t dimensional constellation take values in t fold Cartesian product $A^t$ of the amplitude set A, i.e. in $$A^t = A \times \ldots \times A,$$

where × denotes the Cartesian product.

The t dimensional amplitude mapping process AM maps each shell index s to a t-tuple of ASK amplitudes.

The set S of shell indices is thus given by $$S=\{0,1,2,\ldots,|S|-1\},$$

with $$|S|=\text{card}(S)=2^{t \cdot m}/2^t.$$

The amplitude mapper AM is defined by an amplitude mapping function g according to $$g:S \to A^t.$$

Example: For t=2, i.e. two-dimensional shell mapping, the shell indices s are mapped to amplitude pairs (Ar, Ai) in $A^2 = A \times A$. This corresponds to the pairs of the real and imaginary amplitudes of a $2^{2m}$-QAM constellation. The set S of shell indices s in this case is $$S_{QAM}=\{0,1,2,\ldots,|S|-1\},$$

with $$|S_{QAM}|=\text{card}(S_{QAM})=2^{2 \cdot m}/2^2=M/4,$$

wherein $M=2^{2m}$.

Distribution Matching (DM) Specification

The distribution matching process DM is given by a function h defined as the consecutive action or application of the shell mapping function f and the amplitude mapping function g underlying the shell mapping process SM and the amplitude mapping process AM, respectively:

$$h=g \circ f:\{0,1\}^p \to A^{q \cdot t}$$

with $$h(x)=(g \circ f)(x)=g(f(x)).$$

The inverse distribution matching process $DM^{-1}$ is given by a function $h^{-1}$ defined as the consecutive action or application of the inverse amplitude mapping function $g^{-1}$ and the inverse shell mapping function $f^{-1}$ underlying the inverse amplitude mapping processes $AM^{-1}$ and the inverse shell mapping process $SM^{-1}$, respectively:

$$h^{-1}=f^{-1} \circ g^{-1}:A^{q \cdot t} \supseteq h(\{0,1\}^p) \to \{0,1\}^p.$$

Note that in general the relation $h(\{0, 1\}^p) \neq A^{q \cdot t}$, is fulfilled, i.e. the image $h(\{0, 1\}^p)$ of $\{1, 0\}^p$ under h is not equal to the co-domain $A^{q \cdot t}$ and h is only invertible on its image, i.e. $h^{-1}$ is defined on $h(\{0, 1\}^p)$ only, but not on the entire set $A^{q \cdot t}$.

Origin of Sign Bits

The sign bits used to form the final constellation points may originate from three different sources, i.e.
- directly from the source T1 shown in FIG. 1 in the uncoded case,
- from the parity bits after FEC encoding (this is done by PAS) or
- from both the source T1 and as parity bits after FEC encoding.

EXAMPLE

An example is demonstrated in connection with table 1 shown in FIG. 12. Mapping of a shell index s to the amplitude values Ar, Ai of the real and imaginary part is shown for the considered 16-QAM example.

Amplitude Marginal Distributions for a 16-QAM Example

From the shell index marginal distributions, amplitude marginal distributions can be calculated.

In the 16-QAM example with p=1, q=16, we have the marginal $P_{Ar}(1)=1$; $P_{Ar}(3)=0$, since only shell indices 0; 1 occur, which both correspond to real amplitudes equal to one.

The imaginary amplitude has the marginal $P_{Ai}(3)=PS(1)=1/32$ and $P_{Ai}(1)=31/32$ since the imaginary amplitude is Ai=3 when the shell index is S=1, and it is Ai=1 when the shell index is s=0.

More precise index marginals can be calculated by marginalizing entry wise, i.e. by defining for i=1, 2, ..., q $$P_{S_i}(j) = \frac{\text{number of sequences } s \in f(\{0, 1\}^p) \text{ with } s_i = j}{\text{total number of sequences } (= 2^p)}.$$

The entry wise index marginals PSi can then be used to calculate more precise entry wise marginals for the real and imaginary amplitudes.

Less precise amplitude marginals can be used by using for both dimensions the average of the real and imaginary amplitude marginals.

The bit label marginals required for decoding are calculated from the amplitude marginals according to the labels listed in table 1 according to FIG. 12.

In addition to the foregoing description of the present invention, for an additional disclosure explicit reference is taken to graphic representation of FIGS. 1 to 13.

LIST OF REFERENCE SIGNS

Ai amplitude, imaginary or quadrature part
Ar amplitude, real or in-phase part
AM amplitude mapping process/unit
$AM^{-1}$ amplitude mapping process/unit
IBj input symbol/bit
IBj' input symbol/bit
DM distribution matching process/unit
$DM^{-1}$ inverse/inverted distribution matching process/unit
f shell mapping function for shell mapping process SM
$f^{-1}$ inverse encoding/decoding function
g amplitude mapping function for amplitude mapping process AM
$g^{-1}$ inverse amplitude mapping function
h distribution matching function
$h^{-1}$ inverse distribution matching function
IB input symbol/bit stream
IB' input symbol/bit stream
OB output symbol/bit stream
OB' output symbol/bit stream
OBj output symbol/bit, j=1, ..., m
OBj' output symbol/bit, j=1, ..., m
r(t) sent signal, after channel T4 and before demodulator T5
s(t) signal to be sent, after modulator T3 and before channel T4
s shell index
S set of shell indices
SM shell mapping process/unit
$SM^{-1}$ shell mapping process/unit
smax maximum shell index
T transmission/reception system
T1 information source unit
T2 encoding unit
T3 modulator unit
T4 transmission/reception (waveform) channel unit
T5 demodulator unit
T6 decoder unit
T7 information sink unit
U signal from source T1, before encoder T2
V signal to sink T7, after decoder T6
w shell weighting function
wth threshold value for the weight
X signal, after encoder T2 and before modulator T3
Y signal, after demodulator T5 and before decoder T6

The invention claimed is:

1. A method (C) for converting a data signal (U), the method comprising:
providing an input symbol stream (IB) of input symbols (Bj), the input symbol stream (IB) being representative for the data signal (U) to be converted, and
applying to consecutive disjunct partial input symbol sequences ($IB^p$) of a number of p consecutive input symbols (IBj) covering said input symbol stream (IB), a distribution matching process (DM) to generate and output a final output symbol stream (OB) or a preform thereof,
wherein
p is a fixed natural number,
the distribution matching process (DM) is formed by a preceding shell mapping process (SM) and a succeeding amplitude mapping process (AM),
said shell mapping process (SM) is configured to form and output to said amplitude mapping process (AM) for each of said consecutive partial input symbol sequences ($IB^p$) a sequence ($s^q$) of a number of q shell indices (s),
q is a fixed natural number,
said amplitude mapping process (AM) is configured to assign to each shell index (s) a tuple of amplitude values (Ar, Ai), and
said amplitude values (Ar, Ai) or a sequence thereof are supplied to a probabilistic amplitude shaping process (PAS) to thereby generate and output constellation points or a sequence thereof, respective, as a final output symbol stream (OB) being representative for a converted signal (X) in forward error corrected form.

2. The method (C) of claim 1,
wherein said shell mapping process (SM), the amplitude values (Ar, Ai) of each shell index (s), an underlying shell mapping function (f), and/or an underlying shell weighting function (w) are defined in relation to an assigned index set (S) underlying the shell mapping process (SM), and
wherein
for an underlying M-QAM constellation with $M=2^{2m}$, with m being a fixed natural number, said index set (S) fulfills the following relation (1)

$$S=\{0,1,2,\ldots,smax-1\}, \quad (1)$$

with S denoting the index set and with smax=M/4, and
for a four-dimensional M-QAM constellation having a dual polarization QAM scheme, smax=M/16 is fulfilled for the underlying index set (S).

3. The method (C) of claim 2,
wherein said amplitude mapping process (AM) and each amplitude value are defined by an assigned amplitude mapping function (g) configured to map a respective shell index (s) to a tuple of amplitude values (Ar, Ai), wherein the amplitude values (Ar, Ai) are in particular chosen according to a $2^m$-ASK constellation,
wherein for the underlying M-QAM constellation with $M=2^{2m}$, the constellation point amplitudes of said M-QAM constellation are indexed by said partial input symbol sequences ($IB^p$), and
wherein further said constellation point amplitude indexing is realized by using additional input symbols or bits as sign symbols or bits for defining the sign of said amplitude values (Ar, Ai) for indexing the constellation point amplitudes, wherein for a number of q shell indices (s) and a dimension t of the tuples of amplitude values (Ar, a number t·q of sign symbols or sign bits are realized corresponding to a number t·q of amplitudes.

4. The method (C) of claim 3,
wherein by utilizing said shell mapping function (f) and said amplitude mapping function (g), said shell weighting function (w) is configured to enable selection of the constellation point amplitudes to be indexed by said partial input symbol sequences ($IB^p$) which have or for which the respective amplitude values (Ar, Ai) have a least weight value below a given predefined threshold value (wth), and
wherein by means of said probabilistic amplitude shaping process (PAS) said amplitude values (Ar, Ai) are labeled based on a binary string scheme.

5. The method (C) of claim 1,
wherein providing the input symbol stream (IB) comprises at least one of
recalling the input symbol stream (IB) from a storage medium or from a symbol generation process, and
receiving, demodulating, and/or decoding a signal being representative for or conveying the input symbol stream (IB).

6. The method (C) of claim 1,
wherein at least one of said distribution matching process (DM), said shell mapping process (SM), and said amplitude mapping process (AM) is at least one of based on and chosen according to a predefined distribution to be achieved for an output and in particular based on a Gaussian distribution.

7. The method (C) of claim 1,
wherein at least one of said distribution matching process (DM), said shell mapping process (SM), and said amplitude mapping process (AM) is at least one of based on and chosen to achieve an approach of the empirical distribution of the final output symbol stream (OB) to a respective underlying distribution by accordingly indexing respective output sequences out of a respective entire set of candidates.

8. The method of claim 1,
wherein said input symbol stream (IB), said shell indices (s), and said amplitude values are at least partially formed and/or represented by binary bits.

9. The method of claim 1, further comprising a method (RC) for reconverting a converted data signal (Y), the method for reconverting comprising:
providing an input symbol stream (IB') of input symbols (Bj'), the input symbol stream (TB) being representative for an amplitude sequence of the underlying converted data signal (Y) to be reconverted or a derivative thereof, and
applying to said input symbol stream (TB') or to a derivative thereof an inverse distribution matching process ($DM^-$) to generate and output a final output symbol stream (OB'),
wherein
the inverse distribution matching process ($DM^-$) is formed by a preceding inverse amplitude mapping process ($AM^{-1}$) and a succeeding inverse shell mapping process ($SM^-$),
said inverse amplitude mapping process ($AM^{-1}$) is configured to assign for tuples of amplitude values conveyed by or derived from said input symbol stream (TB') a shell index (s), thereby outputting to the inverse shell mapping process ($SM^-$) a sequence of shell indices (s), and
said inverse shell mapping process ($SM^-$) is configured to form and output for each disjunct consecutive partial sequence ($s^q$) of a number of q consecutive shell indices (s) covering said sequence of shell indices (s), a partial output symbol sequence ($OB^{p\prime}$) of a number of p final output symbols (OBj'), thereby forming and outputting the (re)converted signal (V).

10. The method of claim 9, wherein
the distribution matching process (DM) and the inverse distribution matching process ($DM^{-1}$) are inverse to each other.

11. A data collection system with a data collection section configured to perform the method (C) of claim 1.

12. The data collection system of claim 11, wherein the data collection system comprises a processing unit configured to perform the method (C) of claim 1.

13. A method (RC) for reconverting a converted data signal (Y), the method comprising:
providing an input symbol stream ($IB^p$) of input symbols (Bj'), the input symbol stream ($IB^p$) being representative for an amplitude sequence of the underlying converted data signal (Y) to be reconverted or a derivative thereof, and
applying to said input symbol stream ($IB^p$) or to a derivative thereof an inverse distribution matching process ($DM^{-1}$) to generate and output a final output symbol stream (OB'),
wherein
the inverse distribution matching process ($DM^-$) is formed by a preceding inverse amplitude mapping process ($AM^{-1}$) and a succeeding inverse shell mapping process ($SM^-$),
said inverse amplitude mapping process ($AM^{-1}$) is configured to assign for tuples of amplitude values conveyed by or derived from said input symbol stream (IB$^p$) a shell index (s), thereby outputting to the inverse shell mapping process (SM$^-$) a sequence of shell indices (s), said inverse shell mapping process (SM$^-$) is configured to form and output for each disjunct consecutive partial sequence (s$^q$) of a number of q consecutive shell indices (s) covering said sequence of shell indices (s), a partial output symbol sequence (OB$^{p\prime}$) of a number of p final output symbols (OBj'), thereby forming and outputting a (re)converted signal (V), q is a fixed natural number, p is a fixed natural number, and wherein amplitude values or a sequence thereof are obtained from a preceding inverse probabilistic amplitude shaping process (PAS$^{-1}$) evaluating input constellation point amplitudes or a sequence thereof, respectively, as said input symbol stream (IB') being representative for the converted data signal (Y) to be reconverted in forward error corrected form.

14. The method (RC) of claim 13, wherein said inverse shell mapping process (SM$^-$) and the amplitude value of each shell index (s) are defined by an assigned index set (S) underlying the inverse shell mapping process (SM$^{-1}$) and in particular an underlying shell mapping process (SM), wherein for an underlying M-QAM constellation with M=$2^{2m}$, with m being a fixed natural number, said index set (S) fulfills the following relation (1')

$$S=\{0,1,2,\ldots,smax-1\}, \quad (1')$$

with S denoting the index set and with smax=M/4, and for a four-dimensional M-QAM constellation having a dual polarization QAM scheme, smax=M/16 is fulfilled for the underlying index set (S).

15. The method of claim 13, wherein said inverse amplitude mapping process (AM$^{-1}$) and each shell index (s) amplitude value are defined by an amplitude mapping function (g) of an assigned underlying amplitude mapping process (AM) configured to invertibly map a respective shell index (s) to a tuple of amplitude values, wherein the amplitude values are chosen according to a $2^m$-ASK constellation, wherein for an underlying M-QAM constellation with M=$2^{2m}$, an underlying indexing of constellation point amplitudes of said M-QAM constellation is reinstantiated by disjunct consecutive partial output symbol sequences (OB") of p consecutive final output symbols (OBj'), wherein said constellation point amplitude indexing is realized by using symbols or bits as sign symbols or bits for defining the sign of said amplitude values and by using the remaining symbols or bits of each of said partial output symbol sequences (OB$^{p\prime}$) for indexing the constellation point amplitudes, and m is a fixed natural number.

16. The method of claim 15, wherein an underlying shell mapping function (f), said underlying amplitude mapping function (g), and/or an underlying shell weighting function (w) is or are configured to convey selection of the constellation point amplitudes to be indexed by said partial output symbol sequences (OB$^{p\prime}$) which have or for which the respective amplitude values have a least weight value below a given predefined threshold value (wth).

17. The method (RC) of claim 13, wherein providing the input symbol stream (IB') comprises at least one of recalling the input symbol stream (IB') from a storage medium or from a symbol generation process, and receiving, demodulating, and/or decoding a signal being representative for or conveying the input symbol stream (IB').

18. The method (RC) of claim 13, wherein at least one of said inverse distribution matching process (DM$^{-1}$), said inverse shell mapping process (SM$^-$), and said inverse amplitude mapping process (AM$^{-1}$), is at least one of based on and chosen according to a predefined distribution to be achieved for an output and in particular based on a Gaussian distribution.

19. The method (RC) of claim 13, wherein said input symbol stream (IB'), said shell indices (s), and said amplitude values are at least partially formed and/or represented by binary bits.

20. A data reception system with a data reception section configured to perform the method (RC) of claim 13.

21. The data reception system of claim 20, wherein the data reception system comprises a processing unit configured to perform the method (RC) of claim 13.

22. The method (RC) of claim 13, wherein at least one of said inverse distribution matching process (DM$^{-1}$), said inverse shell mapping process (SM$^-$), and said inverse amplitude mapping process (AM$^{-1}$) is at least one of based on and chosen to achieve an approach of the empirical distribution of the final output symbol stream (OB') to a respective underlying distribution by accordingly indexing respective output sequences out of a respective entire set of candidates.

* * * * *

UNITED STATES PATENT AND TRADEMARK OFFICE
CERTIFICATE OF CORRECTION

| | | |
|---|---|---|
| PATENT NO. | : 10,951,455 B2 | Page 1 of 2 |
| APPLICATION NO. | : 16/461971 | |
| DATED | : March 16, 2021 | |
| INVENTOR(S) | : Georg Böcherer, Patrick Schulte and Fabian Steiner | |

It is certified that error appears in the above-identified patent and that said Letters Patent is hereby corrected as shown below:

In the Claims

Claim 3, Column 17, Line 35, after "values" please delete "$(A_r,)$" and insert --$(A_r, A_i)$-- therefor.

Claim 9, Column 18, Line 14, after "input symbol stream" please delete "(TB)" and insert --(IB)-- therefor.

Claim 9, Column 18, Line 18, after "input symbol stream" please delete "(TB')" and insert --(IB')-- therefor.

Claim 9, Column 18, Lines 19-20, after "matching process" please delete "$(DM^-)$" and insert --$(DM^{-1})$-- therefor.

Claim 9, Column 18, Line 23, after "matching process" please delete "$(DM^-)$" and insert --$(DM^{-1})$-- therefor.

Claim 9, Column 18, Lines 25-26, after "mapping process" please delete "$(SM^-)$" and insert --$(SM^{-1})$-- therefor.

Claim 9, Column 18, Lines 29-30, after "input symbol stream" please delete "(TB')" and insert --(IB')-- therefor.

Claim 9, Column 18, Line 31, after "mapping process" please delete "$(SM^-)$" and insert --$(SM^{-1})$-- therefor.

Claim 9, Column 18, Line 33, after "mapping process" please delete "$(SM^-)$" and insert --$(SM^{-1})$-- therefor.

Claim 13, Column 18, Line 51, after "input symbol stream" please delete "$(IB^p)$" and insert --(IB')-- therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,951,455 B2

Claim 13, Column 18, Line 52, after "input symbol stream" please delete "($IB^p$)" and insert --($IB'$)-- therefor.

Claim 13, Column 18, Line 56, after "input symbol stream" please delete "($IB^p$)" and insert --($IB'$)-- therefor.

Claim 13, Column 18, Line 61, after "matching process" please delete "($DM^-$)" and insert --($DM^{-1}$)-- therefor.

Claim 13, Column 18, Lines 63-64, after "mapping process" please delete "($SM^-$)" and insert --($SM^{-1}$)-- therefor.

Claim 13, Column 19, Line 1, after "stream" please delete "($IB^p$)" and insert --($IB'$)-- therefor.

Claim 13, Column 19, Line 2, after "mapping process" please delete "($SM^-$)" and insert --($SM^{-1}$)-- therefor.

Claim 13, Column 19, Line 4, after "mapping process" please delete "($SM^-$)" and insert --($SM^{-1}$)-- therefor.

Claim 14, Column 19, Line 21, after "mapping process" please delete "($SM^-$)" and insert --($SM^{-1}$)-- therefor.

Claim 15, Column 19, Lines 46-47, after "symbol sequences" please delete "($OB"$)" and insert --($OB^{p'}$)-- therefor.

Claim 18, Column 20, Lines 25-26, after "mapping process" please delete "($SM^-$)" and insert --($SM^{-1}$)-- therefor.